(12) United States Patent
Pushak et al.

(10) Patent No.: US 11,687,540 B2
(45) Date of Patent: Jun. 27, 2023

(54) FAST, APPROXIMATE CONDITIONAL DISTRIBUTION SAMPLING

(71) Applicant: Oracle International Corporation, Redwood Shores, CA (US)

(72) Inventors: Yasha Pushak, Vancouver (CA); Tayler Hetherington, Vancouver (CA); Karoon Rashedi Nia, Vancouver (CA); Zahra Zohrevand, Vancouver (CA); Sanjay Jinturkar, Santa Clara, CA (US); Nipun Agarwal, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 104 days.

(21) Appl. No.: 17/179,265

(22) Filed: Feb. 18, 2021

(65) Prior Publication Data
US 2022/0261400 A1 Aug. 18, 2022

(51) Int. Cl.
*G06F 16/2458* (2019.01)
*G06N 20/00* (2019.01)

(52) U.S. Cl.
CPC ......... *G06F 16/2465* (2019.01); *G06N 20/00* (2019.01)

(58) Field of Classification Search
CPC ........ G06N 20/00; G06N 5/003; G06N 3/045; G06N 7/01; G06N 5/047; G06F 16/2246;
(Continued)

(56) References Cited

U.S. PATENT DOCUMENTS

| 7,475,071 B1 * | 1/2009 | Liu | G06K 9/6276 |
| | | | 707/999.005 |
| 9,582,715 B2 * | 2/2017 | Arunkumar | G06N 20/00 |
| | | | 707/737 |

(Continued)

OTHER PUBLICATIONS

Ribeiro et al., "Why Should I Trust You? Explaining the Predictions of Any Classifier", In Proceedings of the 22nd ACM SIGKDD International Conference on Knowledge Discovery and Data Mining, dated Aug. 2016, 10 pages.

(Continued)

*Primary Examiner* — Yuk Ting Choi
(74) *Attorney, Agent, or Firm* — Hickman Becker Bingham Ledesma LLP

(57) ABSTRACT

Techniques are described for fast approximate conditional sampling by randomly sampling a dataset and then performing a nearest neighbor search on the pre-sampled dataset to reduce the data over which the nearest neighbor search must be performed and, according to an embodiment, to effectively reduce the number of nearest neighbors that are to be found within the random sample. Furthermore, KD-Tree-based stratified sampling is used to generate a representative sample of a dataset. KD-Tree-based stratified sampling may be used to identify the random sample for fast approximate conditional sampling, which reduces variance in the resulting data sample. As such, using KD-Tree-based stratified sampling to generate the random sample for fast approximate conditional sampling ensures that any nearest neighbor selected, for a target data instance, from the random sample is likely to be among the nearest neighbors of the target data instance within the unsampled dataset.

20 Claims, 8 Drawing Sheets

502 GENERATE A KD-TREE THAT COMPRISES THE DATA INSTANCES OF A PARTICULAR DATASET TO BE SAMPLED; WHEREIN THE KD-TREE COMPRISES A PLURALITY OF BUCKETS; WHEREIN EACH BUCKET, OF THE PLURALITY OF BUCKETS, INCLUDES A UNIQUE SET OF SIMILAR DATA INSTANCES FROM THE PARTICULAR DATASET

504 GENERATE A RANDOM SAMPLE DATASET FROM THE PARTICULAR DATASET BY, FOR EACH BUCKET OF THE PLURALITY OF BUCKETS, INCLUDING, IN THE RANDOM SAMPLE DATASET, A RANDOMLY-SELECTED SUBSET OF THE UNIQUE SET OF SIMILAR DATA INSTANCES IN SAID EACH BUCKET

(58) Field of Classification Search
CPC ... G06F 2218/08; G06F 16/78; G06F 16/2465
See application file for complete search history.

(56) References Cited

U.S. PATENT DOCUMENTS

| | | | | |
|---|---|---|---|---|
| 11,176,487 | B2* | 11/2021 | Varadarajan | G06N 20/00 707/999.005 |
| 2013/0151535 | A1* | 6/2013 | Dusberger | G06F 16/2272 707/E17.049 |
| 2020/0097775 | A1* | 3/2020 | Zhu | G06K 9/00536 707/999.005 |
| 2020/0245873 | A1* | 8/2020 | Frank | A61B 5/0823 707/999.005 |
| 2021/0012246 | A1* | 1/2021 | Hazard | G06N 5/02 707/737 |
| 2021/0287136 | A1* | 9/2021 | Das | G06K 9/627 707/999.005 |
| 2022/0222931 | A1* | 7/2022 | Goyal | G06N 20/10 707/999.005 |
| 2022/0261400 | A1* | 8/2022 | Pushak | G06F 16/2465 707/999.005 |
| 2022/0300528 | A1* | 9/2022 | Reymond | G06F 16/26 707/999.005 |
| 2022/0335255 | A1 | 10/2022 | Zohrevand et al. | |
| 2022/0366297 | A1 | 11/2022 | Pushak et al. | |

OTHER PUBLICATIONS

Rdrr.io, "Plot_Superpixels: Test Super Pixel Segmentation", https://rdrr.io/cran/lime/man/plot_superpixels.html, dated Feb. 24, 2022, 2 pages.

Pope et al., "Explainability Methods for Graph Convolutional Neural Networks", In Proceedings of the IEEE/CVF Conference on Computer Vision and Pattern Recognition, dated 2019, 10 pages.

Petkovic et al., "Improving the Explainability of Random Forest Classifier—User Centered Approach", Proceedings of the Pacific Symposium on Biocomputing, https://www.worldscientific.com/doi/pdf/10.1142/9789813235533_0019, dated 2018, 12 pages.

Montavon et al., "Explaining Nonlinear Classification Decisions with Deep Taylor Decomposition", Pattern Recognition, vol. 65, https://www.sciencedirect.com/science/article/pii/S0031320316303582, dated May 2017, 12 pages.

Lundberg et al., "A Unified Approach to Interpreting Model Predictions", 31st Conference on Neural Information Processing Systems, https://proceedings.neurips.cc/paper/2017/file/8a20a8621978632d76c43dfd28b67767-Paper.pdf, dated 2017, 10 pages.

Bach et al., "On Pixel-Wise Explanations for Non-Linear Classifier Decisions by Layer-Wise Relevance Propagation", PloS one, https://journals.plos.org/plosone/article?id=10.1371/journal.pone.0130140, dated Jul. 10, 2015, 46 pages.

Maneewongvatana, S., et al., "It's okay to be skinny, if your friends are fat", Center for geometric computing 4th annual workshop on computational geometry, vol. 2, Dec. 12, 1999, 8pgs.

Aas, Kjersti, et al., "Explaining Individual Predictions When Features Are Dependent: More Accurate Approximations to Shapley Values." arXiv preprint arXiv:1903.10464, Mar. 25, 2019, 25pgs.

Bentley, John Louis, "Multidimensional binary Search Trees Used for Associative Searching", Stanford Univ, Communications of the ACM vol. 18, No. 9, Sep. 1975: pp. 509-517. 9pgs.

Breiman, Leo, "Random forests", Machine learning 45.1 pp. 5-32, Kluwer academic publishers, the Netherlands, Jan. 2001, 28pgs.

Chen, Hugh, et al., "True to the Model or True to the Data?", arXiv preprint arXiv:2006.16234 Jun. 29, 2020, 7pgs.

Frye, Christopher, et al., "Shapley-based explainability on the data manifold", arXiv preprint arXiv:2006.01272, Jun. 2020, 13pgs.

Hooker, Giles et al., "Please Stop Permuting Features: An Explanation and Alternatives", arXiv preprint arXiv:1905.03151 May 1, 2019, 15pgs.

Lundberg, 'Permutation explainer-SHAP latest documentation', API Examples, https://shap.readthedocs.io/en/latest/example_notebooks/api_examples/explainers/Permutation.html 2018, revisiond0b4d59f 7pgs.

1.6. Nearest Neighbors, https://scikit-learn.org/stable/modules/neighbors.html, Aug. 2020, downloaded May 20, 2021, 10pgs.

Lundberg, Scott M., et al., "Consistent individualized feature attribution for tree ensembles", arXiv preprint arXiv:1802.03888 (2018). 9pgs.

Strumbelj, E., et al., "Explaining prediction models and individual predictions with feature contributions", Knowl Inf. Sys., 2014, 41: pp. 647-665. 2014, Springer-Verlag, London, 19pgs.

Mase, Masayoshi, et al., "Explaining Black Box Decisions by Shapley Cohort Refinement", arXiv preprint arXiv:1911.00467, submitted Nov. 1, 2019; Oct. 2019, 20pgs.

Molnar, C., "Ch 5.10, SHAP (Shapley Additive exPlanations), Interpretable machine learning", dwnloaded May 19, 2021, https://christophm.github.io/interpretable-ml-book/, 2019, 17pgs.

Molnar, C., "Ch 5.5, Permutation Feature Importance, Interpretable machine learning", dwnloaded May 19, 2021, https://christophm.github.io/interpretable-ml-book/, 2019, 10pgs.

Molnar, C., "Ch 5.9, Shapley Values, Interpretable machine learning", dwnloaded May 19, 2021, https://christophm.github.io/interpretable-ml-book/, 2019, 13pgs.

Pushak, Y., et al., "Empirical scaling analyzer: An automated system for empirical analysis of performance scaling", AI Communctns, IOS Press, vol. 33, Iss. 2, pp. 93-111, publ. Sep. 22, 2020. 19pgs.

Scipy.org, SciPy v1.6.3 Reference Guide, 'scipy.spatial.cKDTree' https://docs.scipy.org/doc/scipy/reference/generated/scipy.spatial.cKDTree.html, 3pgs.

Shapley, Lloyd S., "The Shapley Value", Essays in Honor of Lloyd S. Shapley. edited by Alvin E. Roth. 1988. 338pgs.

Strobl, C., et al., "Conditional variable importance for random forests", BMC Bioinformatics 2008, 9.307, published Jul. 11, 2008, BioMed Central Ltd., 11pgs.

Lundberg, Scott M., et al., "A Unified Approach to Interpreting Model Predictions", Advances in neural information processing systems, 31st Conf on N.I.P.S. 2017, Long Beach, CA. 10pgs.

SciPy.org, Statistical Functions (scipy.stats), https://scipy.org, SciPy v1.6.1, Feb. 2021, 10 pages.

Gupta, "Locality Sensitive Hashing, An effective way of reducing the dimensionality of your data," https://towardsdatascience.com/understanding-locality-sensitive-hashing-49f6d1f6134, Jun. 29, 2018, 18pgs.

Yakovlev et al., "Oracle Automl: A Fast and Predictive Automl Pipeline", in Proceedings of the VLDB Endowment, vol. 13, No. 12, dated Aug. 2020, 15 pages.

Shapley, Lloyd, "A Value for N-person Games", Contributions to the Theory of Games, vol. 28, doi.org/10.1515/9781400881970-018, dated 1953, 15 pages.

Ribeiro et al., ""Why Should I Trust You?": Explaining the Predictions of Any Classifier", Proceedings of the 22nd ACM SIGKDD International Conference on Knowledge Discovery and Data Mining, dated Aug. 2016, 10 pages.

Plumb et al., "Model Agnostic Supervised Local Explanations", 32nd Conference on Neural Information Processing Systems, dated 2018, 10 pages.

Laugel et al., "Defining Locality for Surrogates in Post-hoc Interpretability", ICML Workshop on Human Interpretability in Machine Learning, arXiv:1806.07498, dated 2018, 7 pages.

Github.com, "Shap Explainers_Permutation", https://github.com/slundberg/shap/blob/7bf645218eb0c40d24b584b05b231cb27babe054/shap/explainers/_permutation.py, dated Apr. 2022, 5 pages.

Castro et al., "Improving Polynomial Estimation of the Shapley Value by Stratified Random Sampling with Optimum Allocation", Computers & Operations Research, vol. 82, dated Jun. 2017, 3 pages.

* cited by examiner

```
┌─────────────────────────────────────────────────────────────────────┐
│ 202 RANDOMLY SAMPLE THE PARTICULAR DATASET TO GENERATE, IN          │
│ MEMORY, A RANDOM SAMPLE DATASET OF THE PARTICULAR DATASET           │
└─────────────────────────────────────────────────────────────────────┘
                                   │
                                   ▼
┌─────────────────────────────────────────────────────────────────────┐
│ 204 IDENTIFY A SET OF NEAREST NEIGHBOR DATA INSTANCES, FROM         │
│        THE RANDOM SAMPLE DATASET, BASED ON ONE OR MORE              │
│ SIMILARITIES BETWEEN A TARGET DATA INSTANCE IN THE PARTICULAR       │
│ DATASET AND THE NEAREST NEIGHBOR DATA INSTANCES OF THE SET          │
│    OF NEAREST NEIGHBOR DATA INSTANCES; WHEREIN THE SET OF           │
│ NEAREST NEIGHBOR DATA INSTANCES HAS A PARTICULAR NUMBER OF          │
│    DATA INSTANCES; WHEREIN EACH DATA INSTANCE, OF THE SET OF        │
│      NEAREST NEIGHBOR DATA INSTANCES, IS ONE OF THE PARTICULAR      │
│ NUMBER OF DATA INSTANCES NEAREST TO THE TARGET DATA INSTANCE        │
│      AMONG THE DATA INSTANCES OF THE RANDOM SAMPLE DATASET          │
└─────────────────────────────────────────────────────────────────────┘
```

FIG. 5

500

502 GENERATE A KD-TREE THAT COMPRISES THE DATA INSTANCES OF A PARTICULAR DATASET TO BE SAMPLED; WHEREIN THE KD-TREE COMPRISES A PLURALITY OF BUCKETS; WHEREIN EACH BUCKET, OF THE PLURALITY OF BUCKETS, INCLUDES A UNIQUE SET OF SIMILAR DATA INSTANCES FROM THE PARTICULAR DATASET

504 GENERATE A RANDOM SAMPLE DATASET FROM THE PARTICULAR DATASET BY, FOR EACH BUCKET OF THE PLURALITY OF BUCKETS, INCLUDING, IN THE RANDOM SAMPLE DATASET, A RANDOMLY-SELECTED SUBSET OF THE UNIQUE SET OF SIMILAR DATA INSTANCES IN SAID EACH BUCKET

FAST, APPROXIMATE CONDITIONAL DISTRIBUTION SAMPLING

FIELD OF THE INVENTION

Techniques described herein relate to efficiently producing stratified random samples of datasets and also to efficiently performing conditional sampling on a dataset.

BACKGROUND

There are many applications in which identifying a smaller amount of data from a larger dataset is useful. A common method of generating a dataset sample is through random sampling, which uses computer-generated pseudo-random numbers to identify data instances, from the target dataset, to include in the sample. Randomly sampling a dataset ensures that a variety of aspects of the dataset are included in the sample. There are different techniques for random sampling, including sampling from the marginal distribution of a dataset (which represents the probability distribution of feature values in the dataset independent of any other features of the dataset) and sampling from a conditional distribution of the dataset (which restricts sample selection to data instances that meet a particular condition).

One application of random sampling is machine learning (ML) explainers, some of which use random sampling to help identify the importance of a particular feature of a dataset on predictions of a target ML model (or "black-box" ML model). Such feature importance-based ML explainers generally use random sampling to identify a sample, from a target dataset, to use in shuffling feature values for data instances in the dataset. The black-box ML model being explained is used to generate predictions for the data instances with perturbed feature values, and then a performance loss is measured for those predictions when compared to predictions generated for data instances without perturbed feature values. Based on the performance loss, the ML explainer determines what features are important to the black-box ML model when generating predictions.

While marginal sampling is a relatively inexpensive and efficient procedure, sampling from the marginal distribution of a dataset can result in data instances with perturbed feature values that represent unrealistic data instances, thus explaining the black-box ML model in regions where predictions of the model cannot be trusted and may never be needed. This can be particularly problematic when the black-box ML model is configured to identify anomalous data, where feature shuffling based on random samples generated using marginal sampling can easily produce perturbed data instances that do not conform to correlations found in the original dataset.

As a simple motivating example, FIG. 1 depicts a (fictional) dataset 100 that contains the weights and ages of a population aged 0-20. The data instance at approximately (age: 18, weight: −150) is considered an anomalous, incorrect record. Further, in FIG. 1, the top and right rug plots show the empirical marginal distributions of the age and weight features, respectively. In other words, the rug plots depict the distribution of each of these features independent of the other feature in the dataset.

In this example, an ML model that is configured to detect anomalies has been employed to locate incorrect, anomalous records within dataset 100, such as the 18-year-old who purportedly weighs negative 150 pounds. The reason that this record is anomalous is clearly because the person's weight was entered incorrectly. However, an ML explainer that generates an explanation for this ML model and that samples from the marginal distribution of dataset 100 is unlikely to identify the weight feature as the important feature for anomaly detection given that unrealistic data instances will likely be created during explanation generation.

To illustrate, the ML explainer identifies a target data instance for a 20-year-old who weighs 150 pounds. To test the importance of the age feature of dataset 100, the ML explainer substitutes the age attribute of the target data instance with the age attribute of one or more data instances drawn from the marginal distribution of the age feature that includes all feature values in the age rug plot. One of the data instances in the random sample has an age attribute value of a 2-year-old, and the ML explainer generates a "perturbed" data instance with the (non-tested) weight value from the target data instance and the age value from the randomly sampled data instance. Clearly, a 2-year-old who weighs 150 pounds should be considered anomalous by any reasonable anomaly detection method. Since a perturbed data instance was created by modifying the age feature of the target data instance, a feature importance-based ML explainer will attribute the change of prediction from "normal" (for the target data instance) to "anomalous" (for the perturbed data instance) to the change in the age feature. Symmetric examples will likely occur for the weight feature. As a result, both features will be considered approximately equally important by the explainer, whether or not both features are, in fact, equally important to the predictions of the ML model.

In fact, the following should always be true for any reasonable anomaly detection ML model: by modifying a single feature of a data instance to an unreasonable value, artificial anomalies will be created from the perspective of the ML model. However, instead of testing whether feature modification can generate artificial anomalies, it is generally more useful to understand which features make a data instance anomalous, i.e., which features isolate the anomalous data instance from the rest of the dataset.

Sampling from conditional distributions can be advantageous in many situations, including to help ML explainers identify features that distinguish anomalous data instances in a dataset. To illustrate, consider that instead of utilizing the marginal distribution for the ML explainer example above, the value for the age of the example 150-pound person is instead sampled from a conditional distribution that represents the age feature values of data instances within the highlighted section of dataset 100 centering on 150 pounds (the value of the non-perturbed weight feature of the target data instance). Sampling from the conditional distribution, the correlations occurring in the dataset are preserved, thus creating approximately realistic records that are far less likely to be flagged as anomalous by the machine learning model. Thus, for dataset 100, the importance of the age feature will not be artificially inflated by perturbed data instances that break correlations in the dataset.

Nevertheless, conditional sampling of a dataset is much slower than marginal sampling because of the requirement to restrict the potential data instances that may be included in a random sample from the dataset. For example, to perform conditional sampling on a dataset, an appropriate method of identifying data instances that are similar to the target data instance must first be performed (such as a k nearest neighbor algorithm, which has a worst-case complexity of $O(k \times n^{1-1/k})$, where k is the number of nearest neighbors to be found and n is the number of data items in the dataset to be searched). The extra expense of conditional sampling can prevent applications that utilize conditional sampling from scaling to large datasets or to datasets with large numbers of features.

To reduce the time required to perform conditional sampling, there are several methods for approximately sampling from a conditional distribution. A non-parametric technique for approximately sampling from a conditional distribution first projects the data into the subspace of features that are not being replaced. Next, this technique finds the most similar data instances to the target data instance in this projected subspace. However, such non-parametric techniques do not scale well in that finding the nearest neighbors of a target data instance in a high-dimensional space is computationally expensive.

Because finding the nearest neighbors of a target data instance in a high-dimensional space is computationally expensive, two alternate methods have been proposed, which mitigate the expense of finding nearest neighbors of a target data instance when the data has more than 3 features. Both of these methods are parametric, i.e., the first assumes the data is Gaussian-distributed and the second assumes the data is Gaussian copula-distributed. When their underlying assumptions are met, the use of parametric models can often substantially improve the quality of a statistical analysis. However, both of these assumptions are likely overly optimistic for many real-world datasets—especially those arising in anomaly detection, where the anomalies themselves must be, by definition, out of distribution.

Accordingly, it has been proposed to address the intractability of the non-parametric technique described above using a surrogate approach, which aims to directly model the value of a coalition using a surrogate machine learning model. For example, the data distribution is modeled using a variational auto-encoder that includes a special third component that allows mapping of the conditional distribution to the latent space. However, this technique introduces several new neural network architectural design choices and hyper-parameters, which must be appropriately set (i.e., by an expert for a given situation) to obtain high quality results. These hyper-parameters may be optimized by validating that the auto-encoder can be used to obtain high quality estimates for the value attributed to each feature coalition for random samples of target data instances, classes and coalitions, for which a particular loss function is proposed. Following this, the provided loss function can be directly optimized using any machine learning model as a surrogate. This surrogate machine learning model (such as a neural network) can then be used to directly estimate the conditional expectation of the value of a coalition, thereby bypassing the need to estimate the conditional distribution of the data at all.

However, while surrogate approaches have been shown to provide compelling results on a small set of examples, it is unclear how easily a surrogate ML model can be trained and at what computational cost. Certainly, to provide high-quality approximations of the value of an arbitrary coalition (of which there are an exponentially increasing number given the number of features in a target dataset), it seems reasonable to assume that a surrogate ML model would need to be trained on many replicates of the training data when subjected to a large number of coalitions (i.e., sets of features "masked out" with un-informative values). It is also unclear whether or not surrogate approaches can reliably provide accurate explanations for highly complex ML models since the complexity of a surrogate ML model must be strictly greater than that of a black-box ML model to be explained.

Thus, it would be beneficial to perform conditional sampling using a technique that scales well and that does not involve an ML model to perform or approximate the conditional sampling.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

BRIEF DESCRIPTION OF THE DRAWINGS

In the drawings:

FIG. 2 depicts a flowchart for performing conditional sampling on a dataset by randomly sampling a dataset and performing a nearest neighbor search on the resulting random sample.

FIG. 5 depicts a flowchart for using a KD-Tree to generate a stratified random sample of a dataset.

DETAILED DESCRIPTION

Figure 1:
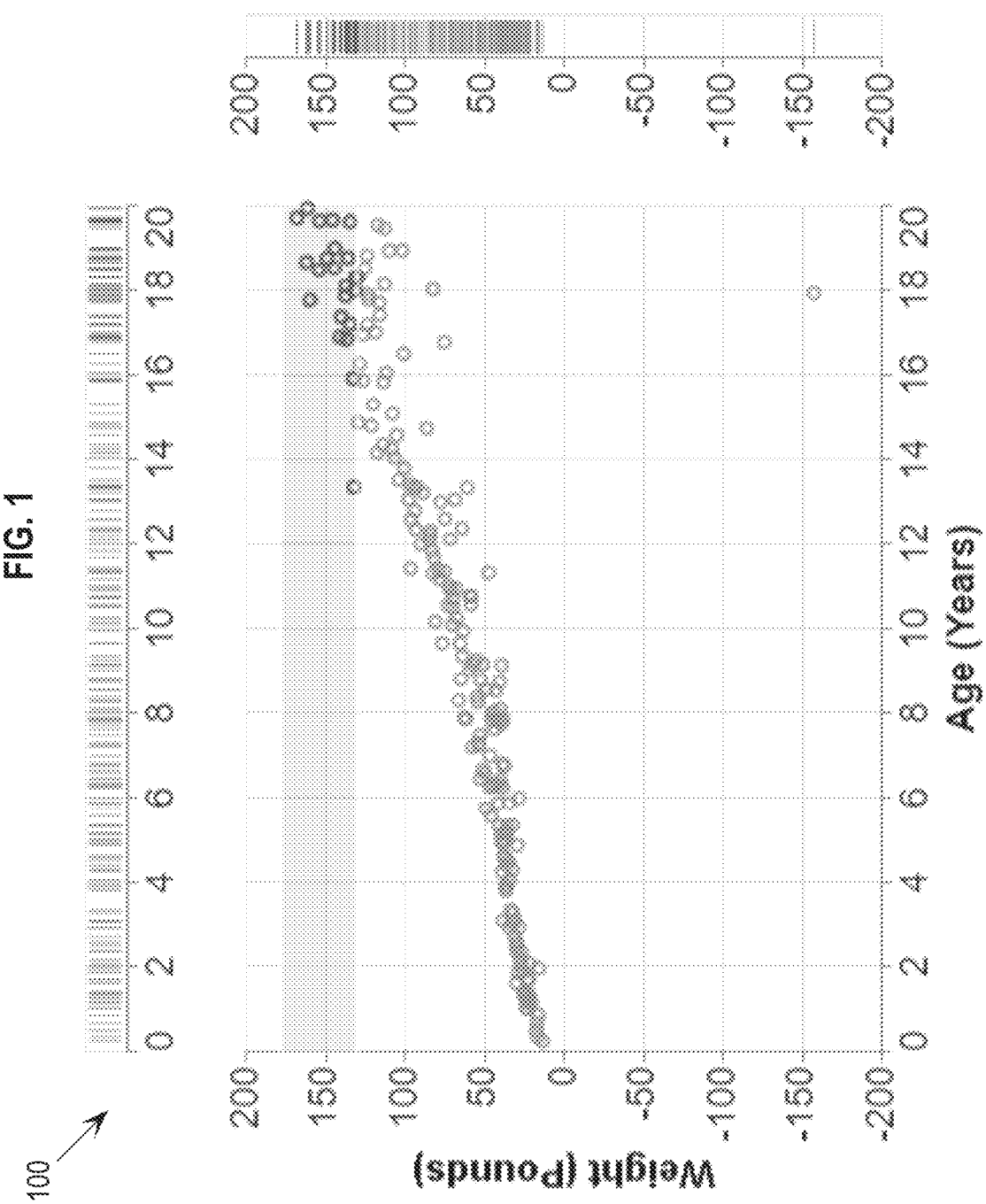
FIG. 1 depicts a dataset containing the weights and ages of a population.

In the following description, for the purposes of explanation, numerous specific details are set forth in order to provide a thorough understanding of the techniques described herein. It will be apparent, however, that the techniques described herein may be practiced without these specific details. In other instances, well-known structures and devices are shown in block diagram form in order to avoid unnecessarily obscuring the techniques described herein.

General Overview

Existing conditional sampling techniques first find, within a full dataset, a set of nearest neighbors for a target data instance and then sample from the nearest neighbors. In contrast, techniques are described herein for fast approximate conditional sampling of a dataset by swapping the order of finding nearest neighbors of a target data instance and performing random sampling. Specifically, techniques for fast approximate conditional sampling described herein randomly sample a dataset and then performing a nearest neighbor search on the pre-sampled dataset to reduce the data over which the nearest neighbor search must be performed and, according to an embodiment, to effectively reduce the number of nearest neighbors that are to be found within the random sample. For example, 1/20th of the data is randomly sampled from a dataset, and then a single nearest neighbor is identified within the pre-sampled data. This novel fast approximate conditional sampling substantially improves the runtime of conditional sampling over existing techniques, especially for large, high-dimensional datasets where existing conditional sampling techniques would be computationally prohibitive.

Furthermore, according to an embodiment, K-Dimensional Tree ("KD-Tree")-based stratified sampling is used to generate a representative sample of a dataset. According to an embodiment, KD-Tree-based stratified sampling is used to identify the random sample for the fast approximate conditional sampling technique described above, which reduces variance in the resulting data sample. Because the variance in the random data sample is reduced, using KD-Tree-based stratified sampling to generate the random sample for fast approximate conditional sampling ensures that any nearest neighbor selected, for a target data instance, from the random sample is likely to be among the nearest neighbors of the target data instance within the unsampled dataset.

Using KD-Tree-based stratified sampling to identify the random sample for the fast approximate conditional sampling technique further improves the stability of the fast approximate conditional sampling technique. Specifically, the variance in output, over calls to the conditional sampling procedure, is reduced, and the average accuracy of the output is improved. Thus, the stability of the conditional sampling technique is improved by ensuring that the generated random samples have better coverage of the feature space of the original dataset. As such, over repeated runs of the procedure, the maximum distance to the nearest neighbor in this sampled space is lower, and hence the returned conditional samples are closer to the original data instance.

Consider a simple example where conditioning is performed on a single feature that has the values: {1, 2, 3, 4, 5, 6, 7, 8, 9} in an original dataset of 9 samples. It is desired to randomly sample instances with feature values similar to 10. Results of randomly sampling this example dataset is described below according to the following techniques: an exact nearest-neighbor-based random sampling technique, a marginal random sampling technique, and the KD-Tree-based stratified random sampling technique:

Exact nearest-neighbor-based random sampling: In this example, the number of neighbors is set to 2 and it is desired to randomly pick one of the identified random set to return as a sample. This technique will always return one of 8 or 9, which are the two closest samples to 10, and which have a mean distance of 1 from the target value.

Marginal random sampling: In this example, one-third of the data is sampled completely at random, and the following values are obtained: {1, 2, 3}. The single nearest neighbor to value 10 is 3, which has a distance of 7 from the target value.

KD-Tree-based stratified random sampling: In this example, a KD-Tree is built on the original dataset based on the target feature, by which the data is partitioned into the following three buckets: {1, 2, 3}|{4, 5, 6}|{7, 8, 9}. Next, a single value is randomly sampled from each bucket to obtain the random sample: {1, 5, 7}. The single nearest neighbor to value 10 is 7 which has distance of 3 from the target value. In this case, there will always be at least one of 7, 8, or 9 in the random sample, and as such, the mean distance of the values returned across sampling runs is 1.5 from the target value.

Of course, marginal random sampling can (and will) include one or more of the values 7, 8 and 9 in the random sample some of the time, but the marginal random technique will also sometimes not produce any of those values in the random sample. Thus, the variance in the distance to the sampled neighbor will be quite higher for marginal random sampling than with KD-Tree-based stratified random sampling with only moderate increase in runtime using the KD-Tree-based stratified random sampling over marginal random sampling.

The fast approximate conditional sampling technique and the KD-Tree-based stratified sampling technique may be used (together or separately) in a variety of applications, including to perform conditional sampling for end-to-end global or local feature importance explainers, thereby obtaining fast approximations to feature attributions that preserve the data distribution. Preserving the data distribution in the context of ML explainers produces explanations that better explain the data, as viewed by the model, rather than explanations that uniquely explain the model. Preserving the data distribution of a random sample is particularly useful when computing explanations for anomaly detection ML models, an application for which using parametric conditional sampling and marginal sampling (which are both fast) provide particularly poor explanations.

Furthermore, these techniques are substantially faster than other non-parametric conditional sampling methods—especially for high-dimensional data. The efficiency of techniques described herein allows model-agnostic ML explainer methods, such as Permutation Feature Importance (PI), Kernel SHAP, or SHAP-PI (described in further detail below), to be applied to any ML model while sampling from an approximation of the conditional distribution of the data without regard to the dimensionality or size of the dataset.

Conditional Sampling Using Exact Projected Neighbors

To help illustrate the fast approximate conditional sampling techniques, sampling from an approximation of a conditional distribution using nearest-neighbor queries in projected subspaces is first described, i.e., in connection with Algorithm 1 below. The techniques herein are described in connection with ML explanation methods to provide context, but are not limited to ML explanation applications.

Model-agnostic explanation methods take as input: a dataset, X, which contains n data instances (or data records) and which each have |F| features; and a corresponding set of target values y, which may either be the true target values (in a supervised setting) or the values predicted by the model (in an unsupervised setting). (Feature importance-based ML explainers are described in more detail below, e.g., in connection with FIG. 6.) Let the value(s) of a feature (or set of features) that are currently being replacing be $f_{replace} \subseteq F$. Let X[i] be a target data instance, for which the feature(s) $f_{replace}$ are to be replaced, in order to assess the importance of $f_{replace}$ in a black-box ML model's ability to predict y[i].

Algorithm 1:

1.1 Project out the features to be replaced. First all the data, X, is projected into the subspace of features, $f_{keep}$, that are not being replaced, i.e., $f_{keep} = F \backslash f_{replace}$. The data in this projected subspace is denoted by $proj_{f_{keep}}(X)$.

1.2 Find a set of k neighbors in the subspace. Next, any (approximate) nearest neighbor method is used to find a set of data instances, $$\{proj_{f_{keep}}(X)[j_1], proj_{f_{keep}}(X)[j_2], \ldots, proj_{f_{keep}}(X)[j_k]\},$$

that are similar to $proj_{f_{keep}}(X)[i]$.

1.3 Randomly sample one of the neighbors. A single random neighbor $$proj_{f_{keep}}(X)[j] \in \{proj_{f_{keep}}(X)[j_1], proj_{f_{keep}}(X)[j_2], \ldots, proj_{f_{keep}}(X)[j_k]\},$$

is picked from the set of k neighbors.

1.4 Replace feature values with the neighbor's values. Then, the feature values $f_{replace}$ of X[i] are replaced with those from X[j]. This creates an approximately realistic data instance, $X[i]_{perturbed}$, in which the features, $f_{replace}$, are modified with values that are likely to occur when conditioning on the other features, $f_{keep}$.

1.5 Evaluate impact to model. The new (perturbed) data instance $X[i]_{perturbed}$ is then given to the model to obtain a prediction $y[i]_{perturbed}$. Finally, the difference between y[i] and $y[i]_{perturbed}$ is used to assess the importance of $f_{replace}$ according to the metric that is used by the feature attribution method of choice (e.g., PI, SHAP-PI, SHAP, etc.).

1.6 Repeat and average. Steps 1.1-1.5 are repeated as many times as needed for as many data instances X[i] as required by the feature attribution method being used.

When using the projected nearest neighbors technique of Algorithm 1 with a feature importance-based ML explainer, which replaces the value of a feature $n_{iterations}$ times, k may be set to equal $n_{iterations}$. For example, when 20 iterations of PI are used for ML model explanations, k is accordingly set to 20. In this way, the k nearest neighbors of $proj_{fkeep}(X)[i]$ computed in step 1.3 can be pre-computed a single time, and a random one can be selected for each of the iterations in steps 1.4 and 1.5. However, for approximate Shapley-based methods like SHAP-PI, different feature coalitions are used in each iteration, and step 1.3 of Algorithm 1 is used to find a new set of projected neighbors for each iteration.

Fast Approximate Conditional Sampling

Steps 1.1 and 1.2 of Algorithm 1 are conditioning steps, and step 1.2 is generally very slow. There are numerous approximate nearest neighbor methods that can be used to find $proj_{fkeep}(X)[j]$ to help speed up this portion of Algorithm 1. For example, an exact (or a 1+epsilon-approximate) k-nearest neighbor method can be used to find k approximate nearest neighbors, from which a single approximate nearest neighbor can be sampled uniformly at random. Any such method can be used to improve the running time of Algorithm 1 at a relatively minimal cost to the quality of the explanation. However, based on experimentation, none of these provide an adequate speedup so as to render Algorithm 1 computationally feasible for large, high-dimensional datasets.

Thus, according to an embodiment, techniques described herein implement fast approximate conditional sampling using a second level of approximation, which substantially speeds up the overall procedure. The key idea is to swap the order of steps 1.2 and 1.3 of Algorithm 1, thereby substantially reducing the size of the dataset over which nearest neighbor queries must be performed. Furthermore, according to an embodiment, the number of nearest neighbors that are required to be identified at a time is also reduced. The technique for fast approximate conditional sampling is outlined by Algorithm 2 below:

Algorithm 2:

2.1 Project out the features to be replaced. First all the data, X, is projected into the subspace of features, $f_{keep}$, that are not being replaced, i.e., $f_{keep}=F\setminus f_{replace}$. The data in this projected subspace is denoted by $proj_{fkeep}(X)$.

2.2. Randomly sample $$\frac{1}{k^{th}}$$

of the data. Let $proj_{fkeep}(X')$ be a dataset with $$\frac{1}{k^{th}}$$

of the rows of X randomly sampled from $proj_{fkeep}(X)$.

2.3. Find a single nearest neighbor in the subspace. Next, any (approximate) nearest neighbor method is used to find a single nearest neighbor, $proj_{fkeep}(X')[j]$, to $proj_{fkeep}(X)[i]$, in $proj_{fkeep}(X')$.

2.4. Replace feature values with the neighbor's values. Then, the feature values $f_{replace}$ of X[i] are replaced with those from X[j]. This creates an approximately realistic data instance, $X[i]_{perturbed}$.

2.5. Evaluate impact to model. The new data instance $X[i]_{perturbed}$ is then given to the model to obtain a prediction $y[i]_{perturbed}$. Finally, the difference between y[i] and $y[i]_{perturbed}$ is used to assess the importance of $f_{replace}$ according to the metric that is used by the feature attribution method of choice (e.g., PI, SHAP-PI, SHAP, etc.). 2.6. Repeat and average. Steps 2.1-2.5 are repeated as many times as needed for as many data instances X[i] as required by the feature attribution method being used.

Figure 3:
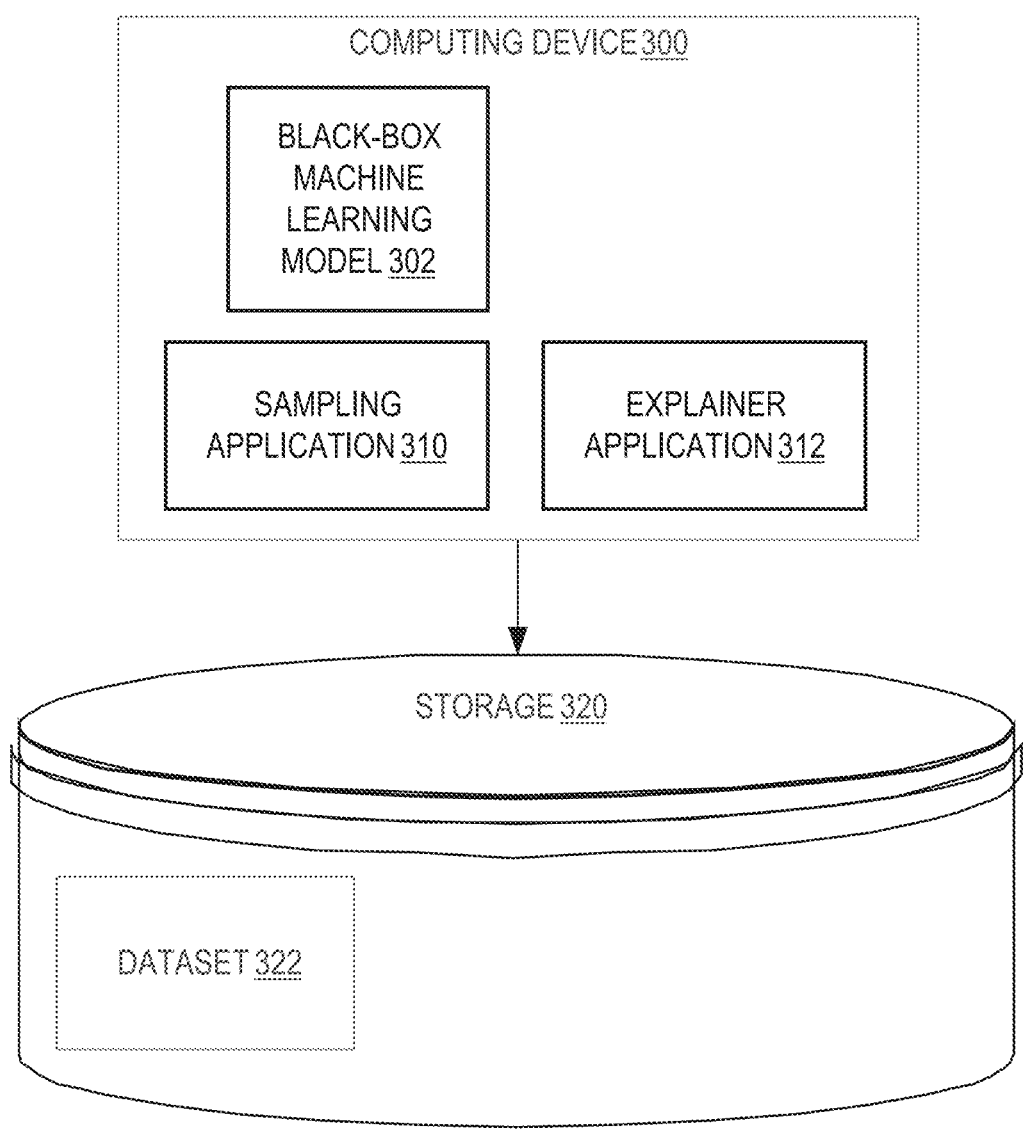
FIG. 3 is a block diagram of an example computing device running a sampling application.

Algorithm 2 is further described in connection with flowchart 200 of FIG. 2. Flowchart 200 described below in connection with an example computing device depicted in FIG. 3. Specifically, FIG. 3 depicts a block diagram of an example computing device 300 running a sampling application 310 that performs random data sampling according to techniques described herein, and an example explainer application 312 that produces explanations for ML models (such as black-box ML model 302). While sampling application 310 is depicted as a stand-alone application, sampling application 310 (and the techniques attributed thereto) may be integrated into any other application, such as explainer application 312. Computing device 300 is communicatively connected to persistent storage 320, which includes a dataset 322 comprising a plurality of data instances. The system depicted in FIG. 3 is used to explain techniques described herein; however, embodiments are not limited to the system configuration depicted in FIG. 3. Furthermore, while the data sampling techniques described herein are, at times, described in the context of ML explainers, these techniques are not limited to the context of ML explainers and may be used for any kind of application that implements data sampling.

At step 202 of flowchart 200, a particular dataset is randomly sampled to generate, in memory, a random sample dataset of the particular dataset. For example, sampling application 310 of computing device 300 generates, in memory of computing device 300, a random sample of dataset 322, stored at storage 320, that has been projected into the subspace of features of dataset 322 that are not being replaced. According to an embodiment described in connection with step 2.2 of Algorithm 2, the random sample dataset represents $$\frac{1}{k^{th}}$$

of dataset 322.

According to an embodiment, sampling application 310 generates the random sample dataset, from dataset 322, using KD-Tree-based stratified sampling, as described in further detail below. According to another embodiment, sampling application 310 uses another technique to generate the random sample from dataset 322, e.g., by randomly sampling from a marginal distribution of the data or by generating a representative random sample using a technique other than KD-Tree-based stratified sampling.

At step 204 of flowchart 200, a set of nearest neighbor data instances are identified, from the random sample dataset, based on one or more similarities between a target data instance in the particular dataset and the nearest neighbor data instances of the set of nearest neighbor data instances, where the set of nearest neighbor data instances has a particular number of data instances, and where each data instance, of the set of nearest neighbor data instances, is one of the particular number of data instances nearest to the target data instance among the data instances of the random sample dataset. According to an embodiment, step 204 of flowchart 200 is performed after step 202 of the flowchart.

To illustrate step 204, sampling application 310 maintains information for a target data instance from dataset 322, and sampling application 310 identifies one or more nearest neighbor data instances, for the target data instance, from the random sample dataset. To illustrate, the one or more nearest neighbor data instances comprise feature values (for features of the dataset) that are more similar to feature values of the target data instance than feature values for data instances in the random sample dataset that are excluded from the one or more nearest neighbor data instances.

Figure 4:
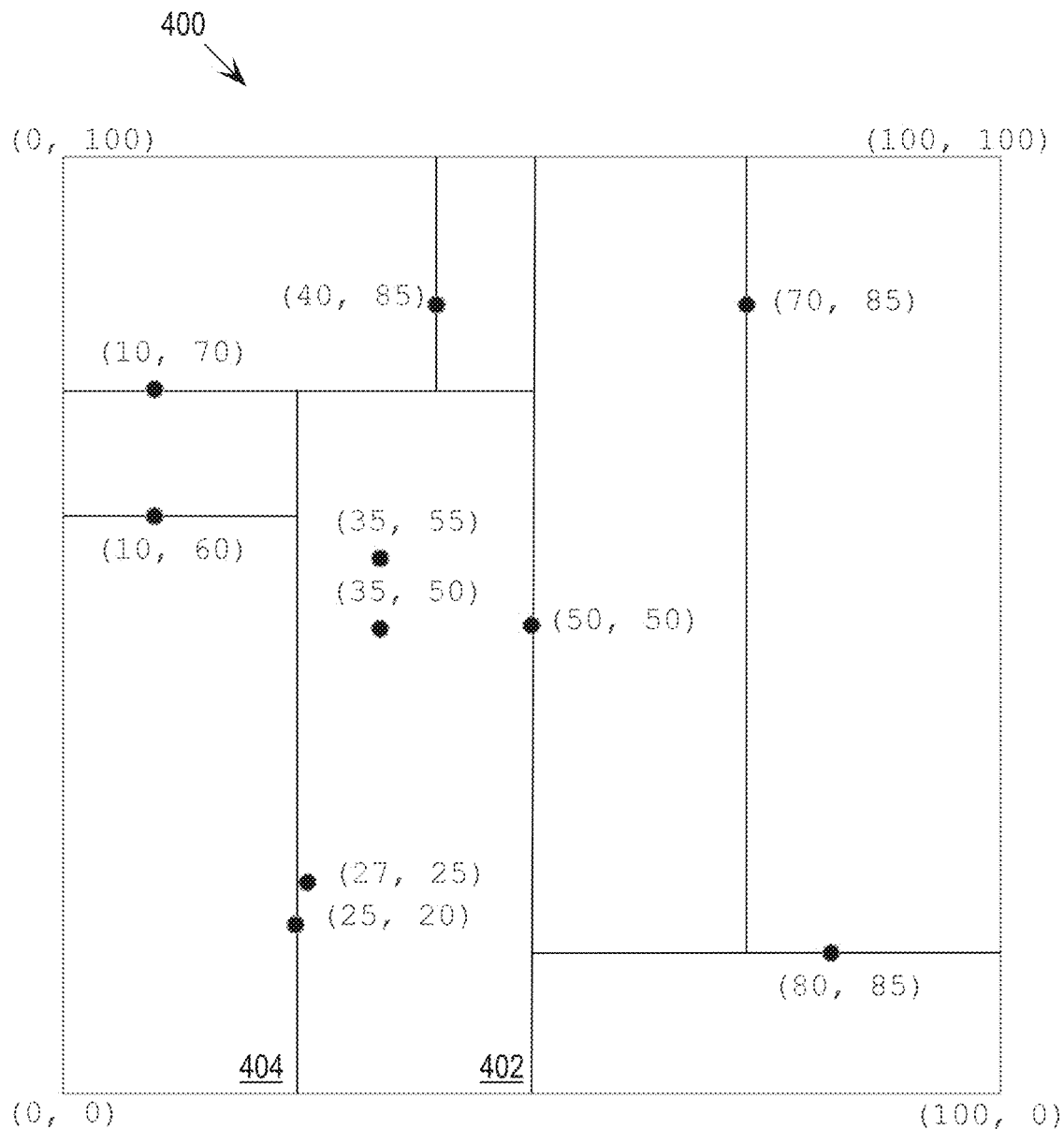
FIG. 4 depicts an example KD-Tree.

According to an embodiment, sampling application 310 identifies the nearest neighbor(s) of the target data instance, from the random sample of dataset 322, using a KD-Tree. (For additional information on KD-Trees, see "Multidimensional binary search trees used for associative searching" by Bentley, Jon Louis. *Communications of the ACM* 18.9 (1975): 509-517, the entire contents of which are hereby incorporated by reference as if fully set forth herein.) Specifically, sampling application 310 generates a sample-specific KD-Tree populated with the random sample of dataset 322 (generated at step 202). To illustrate, FIG. 4 depicts an example KD-Tree 400 that sorts data with two features (x, y) into a plurality of buckets defined by the points indicated within the grid. Each box in KD-Tree 400 represents a respective bucket (or leaf node of the tree), and any data instances that fall within the bounds defined bucket are considered to be similar data instances. According to an embodiment, a KD-Tree is configured such that each bucket of the tree includes approximately the same number of data instances. Data instances within a bucket may be close to a bucket boundary. For example, data instance (27, 25) in bucket 402 is relatively close to the boundary of the bucket marked by data instance (25, 20), while data instance (35, 50) is relatively far away from all of the boundaries of bucket 402.

The k nearest neighbors of a particular target data instance are the k data instances that are either in a target bucket that would include the target data instance, or are in neighbor buckets of the target bucket. The first-degree neighbor buckets of the target bucket share boundaries with the target bucket. When there are a small number of nearest neighbors to find (e.g., 1-2), it is generally sufficient to access only the first-degree neighbors (if needed) to prove that an identified nearest neighbor(s) is the closest data instance to the target data instance within the KD-Tree. However, it is possible that the nearest neighbor search could extend into an exponentially increasing number of higher-degree neighbor buckets (e.g., second-degree neighbor buckets that share at least one boundary with the first-degree neighbor buckets, third-degree neighbor buckets that share at least one boundary with the second-degree neighbor buckets, etc.), especially in high-dimensional datasets and where more than a small number of nearest neighbors are sought from a single KD-Tree. Thus, searching for a very small number of nearest neighbors within a KD-Tree can significantly reduce the time required for the nearest neighbor search.

Returning to the example of FIG. 4, in order to identify k=1 nearest neighbors for example target data instance (35, 50), where bucket 402 includes only data instance (27, 25), data instance (35, 50), and data instance (35, 55), it is clear that no other data instance in KD-Tree 400 could be nearer to data instance (35, 50) than data instance (35, 55) given that the boundaries of bucket 402 are farther from the example target data instance than data instance (35, 55). Thus, in this case, sampling application 310 identifies the nearest neighbor for the example target data instance without accessing any bucket other than bucket 402. However, for example target data instance (27, 25), the boundary of bucket 402 defined by data instance (25, 20) is closer to the example target data instance than any other data instance in bucket 402. In this case, at least one neighbor bucket (i.e., at least the first-degree neighbor bucket 404) is searched to determine whether there is a data instance within the neighbor bucket that is closer to the example target data instance than the other data instances in bucket 402.

According to an embodiment, where multiple nearest neighbors are desired to be identified in the random sample dataset, the random sample dataset may be configured to represent a larger portion of dataset 322 than $$\frac{1}{k^{th}}$$

of the dataset. For example, if two nearest neighbors are to be identified from the random sample dataset, the random sample dataset may be configured to represent $$\frac{2}{k^{th}}$$

of dataset 322. Alternatively, if multiple nearest neighbors are to be identified from the random sample dataset, the process of identifying a random sample from the dataset and selecting a single nearest neighbor from the random sample may be performed multiple times.

It takes approximately O(n·log n) operations to build the KD-Tree, where n is the number of data instances in the tree. In the case where the KD-Tree is being populated with a random sample that is $$\frac{1}{k^{th}}$$

of the dataset, the step of building the KD-Tree for the nearest neighbor search is over k times faster than for the nearest neighbor search of Algorithm 1, where k is typically set to 20. In preliminary experiments, a 3.7-fold speedup using the fast approximate conditional sampling is observed on a four-dimensional dataset. The true speedup does not reach k=20 because there are introduced some overhead costs for the initial sampling step. However, the speedup is expected to be even more significant on higher-dimensional datasets, where querying a KD-Tree to find the k nearest neighbors for a data instance requires approximately ($2^{k-1}$·log(n)) operations. Since, in step 2.3 of Algorithm 2, k=1 thereby reducing the number of buckets that need to be accessed to identify nearest neighbors (as described above), the computational savings for this step can also be enormous. Furthermore, pre-sampling the data allows for identification of a smaller number of neighbors for a target data instance (e.g., 1 when the data sample is $$\frac{1}{k^{th}}$$

of the original dataset), which leads to a $2^{k-1}$ speedup for nearest neighbor queries in a high-dimensional dataset.

Using Fast Approximate Conditional Sampling for an ML Explainer

According to an embodiment, using the set of nearest neighbor data instances identified by sampling application 310 according to flowchart 200 described above, explainer application 312, implementing a feature importance-based explanation technique, generates a set of generated (perturbed) data instances. Specifically, explainer application 312 generates a set of generated data instances, based on the target data instance, by generating, for each nearest neighbor data instance of the set of nearest neighbor data instances, a corresponding generated data instance comprising: (a) a feature value of said each nearest neighbor data instance for a particular tested feature of the corresponding generated data instance, and (b) feature values of the target data instance for all features of the corresponding generated data instance other than the particular tested feature. To illustrate, explainer application 312 creates a generated data instance for every nearest neighbor of the target data instance that has been identified according to step 204 by using all features from the target data instance other than a "tested feature".

This generated data instance may be used for feature attribution estimation. For example, ML model 302 may be used to generate a first prediction for the target data instance and a second prediction for the generated data instance. Explainer application 312 determines a difference metric that measures a difference between the first and second predictions. Explainer application 312 uses this difference metric to determine an importance score for the tested feature with respect to ML model 302. Explainer application 312 may use any kind of feature importance-based explainer technique that is implemented using conditional sampling.

While swapping the order of steps 1.2 and 1.3 (as shown in steps 2.2 and 2.3 in Algorithm 2) allows the fast approximate conditional sampling technique described herein to substantially reduce its computational cost, this order of operations also increases the variance in the feature attribution estimates produced by an ML explainer that uses the technique. To illustrate, sampling $$\frac{1}{k^{th}}$$

of the original dataset can result in a random sample that is "patchy", containing regions of the data distribution that are under-represented due to random chance. When, later, neighbors are found for data instances from $proj_{fkeep}(X)$ that come from these under-represented regions, these neighbors can end up being much farther away than they would have been if Algorithm 1 had been used (i.e., if the nearest neighbors were sought in the original dataset). Use of patchy random samples to produce ML explanations generally reduces the quality of the explanations.

Kd-Tree-Based Stratified Random Sampling

Stratified random sampling is a variance reduction technique used to reduce variance introduced by random sampling. (For additional information on stratified random sampling, see "Empirical scaling analyzer: An automated system for empirical analysis of performance scaling" by Pushak, Yasha, Zongxu Mu, and Holger H. Hoos. *AI Communications Preprint* (2020): 1-19, the entire contents of which are hereby incorporated by reference as if fully set forth herein.) However, stratified random sampling requires data instances to each be assigned to a unique category. Stratified random sampling is then used to obtain a "balanced" subset of the data by selecting representative fractions from each category. For example, if a population of citizens is 48% "male", 51% "female" and 1% "other", then a stratified random sample of 1000 citizens would contain 480 "male", 510 "female", and 10 "other" citizens, each of which would be chosen uniformly at random from within their respective sub-populations, thereby ensuring that the "other" minority class is not completely omitted during the downstream statistical analysis, which could happen when sampling from the marginal distribution of the data instances.

This form of stratified random sampling is not applicable in this context, where useful categories for stratification do not exist a priori, which is commonly required for applications such as ML explainers. Specifically, many times, categories for stratified random sampling should represent groups of data instances that contain similar sets of feature values. While these categories could be determined on a per-coalition basis, it generally suffices to find a single set of categories using all of the features, since if two data instances are similar with respect to all of their features, then they should also be similar with respect to any subset of their features.

According to an embodiment, a KD-Tree is used to perform stratified random sampling for a high-dimensional dataset. FIG. 5 depicts a flowchart 500 for using a KD-Tree to generate a stratified random sample of a dataset. Specifically, at step 502 of flowchart 500, a KD-Tree is generated, where the KD-Tree comprises the data instances of a particular dataset to be sampled, where the KD-Tree comprises a plurality of buckets, and where each bucket, of the plurality of buckets, includes a unique set of similar data instances from the particular dataset. For example, sampling application 310 generates a KD-Tree that comprises the data instances of dataset 322, where each of the data instances of dataset 322 is assigned to a respective bucket of a plurality of buckets of the KD-Tree.

According to an embodiment, to populate a KD-Tree, sampling application 310 recursively divides the data of dataset 322 into buckets where, at each recursive step, application 310 randomly selects a feature of the dataset and splits the data into two buckets based on a median value of the randomly selected feature. Generation of a KD-Tree is relatively inexpensive, with a complexity of O(n·log(n)), where n is the size of the dataset.

When used with the fast approximate conditional sampling technique described herein, the KD-Tree need only be generated once. Once generated, the KD-Tree is used for each iteration of the conditional sampling algorithm.

At step 504, a random sample dataset is generated from the particular dataset by, for each bucket of the plurality of buckets, including, in the random sample dataset, a randomly-selected subset of the unique set of similar data instances in said each bucket. For example, sampling application 310 generates a random sample of dataset 322 by randomly selecting data instances from each bucket of the KD-Tree generated at step 502. According to an embodiment, sampling application 310 selects the same number of data instances from each bucket of the KD-Tree. Sampling data instances from each bucket of the KD-Tree ensures that the random sample includes data instances from each range of data instances defined by the buckets. Without guidance of the KD-tree, data instances from one or more of the different defined ranges might be excluded from the random sample.

Fast Approximate Conditional Sampling Using KD-Tree-Based Stratified Sampling

Because KD-Tree-based stratified random sampling ensures better coverage of the dataset feature space, this stratified sampling technique may be used to reduce variance in the random sample produced by fast approximate conditional sampling techniques described above. Therefore, according to an embodiment, an additional pre-processing step is added to Algorithm 2, as shown in Algorithm 3 below, which builds a KD-Tree for the entire dataset and assigns each data instance to a category based on the leaf (bucket) in the tree to which the data instance belongs.

Algorithm 3:

3.0. Build a KD-Tree and assign categories by leaf. A KD-Tree is built to contain every data instance in X, using all of the features of X. Then, each data instance is assigned a unique category label based on the leaf of the KD-Tree to which the data instance belongs.

3.1. Project out the features to be replaced. Then, all the data, X, is projected into the subspace of features, $f_{keep}$, that are not being replaced, i.e., $f_{keep}=F\backslash f_{replace}$. The data in this projected subspace is denoted by $proj_{fkeep}(X)$.

3.2. Select a stratified, random sample of $$\frac{1}{k^{th}}$$

of the data. Let $proj_{fkeep}(X')$ be a dataset with $$\frac{1}{k^{th}}$$

of the rows or X randomly sampled from $proj_{fkeep}(X)$. Stratified random sampling is used so that each leaf of the KD-Tree from step 0 has equal representation in the sampled data.

3.3. Find a single nearest neighbor in the subspace. Next, any (approximate) nearest neighbor method is used to find the single nearest neighbor, $proj_{fkeep}(X')[j]$, to $proj_{fkeep}(X)[i]$, in $proj_{fkeep}(X')$.

3.4. Replace feature values with the neighbor's values. Then, the feature values $f_{replace}$ of X[i] are replaced with those from X[j]. This creates an approximately realistic data instance, $X[i]_{perturbed}$.

3.5. Evaluate impact to model. The new data instance $X[i]_{perturbed}$ is then given to the model to obtain a prediction $y[i]_{perturbed}$. Finally, the difference between y[i] and $y[i]_{perturbed}$ is used to assess the importance of $f_{replace}$ according to the metric that is used by the feature attribution method of choice (e.g., PI, SHAP-PI, SHAP, etc.).

3.6. Repeat and average. Steps 3.1-3.5 are repeated as many times as needed for as many data instances X[i] as required by the feature attribution method being used.

While using a KD-Tree to perform stratified sampling is beneficial in connection with techniques for fast approximate conditional sampling described herein, this technique for stratified sampling is applicable in other technologies. For example, it may be beneficial to use KD-Tree-based stratified random sampling when down-sampling a dataset prior to training a machine learning model in order to obtain a small but balanced training set, e.g., to obtain a fast approximation of how the model will perform. Using a KD-Tree to obtain the sample of the dataset ensures that the sample will be representative of the range of feature values of the dataset.

Using Fast Approximate Conditional Sampling for Shapley-Based Global Feature Importance with Projected Neighbors (SHAPPN)

Techniques for random sampling described herein can be used in combination with any perturbation-based feature attribution method that would normally represent the "absence" of one or more features by sampling those features from their respective empirical conditional distributions. An example is given below to illustrate using fast approximate conditional sampling (with KD-Tree-based stratified sampling) in connection with computing global ML explanations using Shapley values. However, techniques described herein are not limited to this application and other ML explainer methods (e.g., perturbation-based feature attribution methods) can utilize techniques described herein. Shapley values are typically computed for local explanations; the underlying algorithm is adjusted to serve as a global explainer. Thus, fast approximate conditional sampling described herein may be combined with local ML explainers in a manner similar to combining fast approximate conditional sampling with global ML explainers as described herein.

The following Algorithm 4 illustrates a pseudocode implementation of an example global Shapley value ML explainer that includes techniques for fast approximate conditional sampling as described in connection with Algorithm 3 above. Inputs to the example global Shapley value explainer include the following:

F—The set of features for which attributions are to be calculated.

X—A dataset (e.g., dataset 322) that is representative of the data used during training/testing of black-box ML model 302. According to an embodiment, X contains |F| columns (features) and n rows (data instances). Let the $i^{th}$ data instance be indexed by X[i].

n—The total number of data instances in X.

y—The target values corresponding to the data in X. According to an embodiment, these are the true target values in a supervised machine learning setting and the model predictions in an unsupervised setting.

model—The fitted (black-box) machine learning model 302 to be explained.

score—A function that accepts two parameters y and $y_{perturbed}$, and returns a score that measures how closely $y_{perturbed}$ perturbed matches y.

$n_{iterations}$—The number of iterations of permutation importance to be performed. The value 20 is often sufficient; however, this value may be increased to improve the quality of the explanations and to reduce the variance between explanations; this value may also be decreased for the ML explainer to run faster.

T—A KD-Tree used to perform KD-Tree-based stratified random sampling.

T'—A KD-Tree used to perform k nearest neighbor search for fast approximate conditional sampling.

leaf$_{size}$—The maximum number of data instances within each of the leaves of T. According to an embodiment, this value is set to $$\left\lceil \frac{n}{n_{iterations}} \right\rceil,$$

which allows for a representative sample within each leaf (bucket) of the KD-Tree based on the total number of data instances in X.

n$_{samples}$—The number of random samples taken from each of the leaves of T. According to an embodiment, this value is set to 1.

k—The number of nearest neighbors to find for each data instance. According to an embodiment, this value is set to 1.

Outputs to the example global Shapley value ML explainer include ($l_{f_1}$, $l_{f_2}$, . . . , $l_{f_{|F|}}$), which is a tuple containing the estimate for the feature attribution for each feature f ε F.

---

ALGORITHM 4:

4.1. Set $s_0$ = score(y, model(X)).
4.2. Fit a balanced KD-Tree, T, to X, such that each leaf contains at most leaf$_{size}$ data instances.
4.3. Assign each data instance [i] a categorical label c[i] based on which leaf of T to which the data instance belongs.
4.4. For all combinations of features $f_{replace}$ ∈ F:
  a. Set $f_{keep}$ = F\{$f_{replace}$}.
  b. Project X onto $f_{keep}$ to obtain proj$_{f_{keep}}$(X).
  c. For j =1, . . . , n$_{iterations}$:
    i. Use the labels c[i] to perform stratified random sampling to pick a sample proj$_{f_{keep}}$(X') of data instances from proj$_{f_{keep}}$(X) that contains n$_{samples}$ samples from each leaf of T.
    ii. Fit a KD-Tree, T', to proj$_{f_{keep}}$(X').
    iii. Create a copy of X called X$_{perturbed}$.
    iv. For i =1, . . . , n:
      1. Use T' to obtain the index, neighbor, of the nearest neighbor of
        proj$_{f_{keep}}$(X)[i] in proj$_{f_{keep}}$(X').
      2. Use the values from the features, $f_{replace}$, of X[neighbor] to update the features, $f_{replace}$ of the data instance X$_{perturbed}$ [i].
    v. Make predictions y$_{perturbed}$ = model(X$_{perturbed}$) for the perturbed data.
    vi. Set s$_{f_{keep}}$ [j] = $s_0$ − score(y$_{perturbed}$, y).
  d. Set value$_{f_{keep}}$ = mea(s$_{f_{keep}}$[1], . . . , s$_{f_{keep}}$ [n_iterations]).
4.5. For each feature f ∈ F:
  a. Set $$I_f = \sum_{f_{keep} \subseteq F\setminus\{f\}} \frac{|S|! \cdot (|F| - |S| - 1)!}{|F|!} \cdot \left( value_{f_{keep} \cup \{f\}} - value_{f_{keep}} \right)$$

4.6. Return ($I_{f_1}$, $I_{f_2}$, . . . , $I_{f_{|F|}}$).

---

Experimental Analysis

A small set of experiments were performed to quantify the impact of adding the fast approximate conditional distribution sampling techniques described herein to a global Shapley value ML explainer. Most often, users cannot afford to run an exact Shapley value method, as the number of feature coalitions that must be evaluated grows exponentially with the number of features, which is typically prohibitively expensive for even a moderate number of features (e.g., 10 or more). Therefore, the impact of the described techniques was assessed when combined with a global version of SHAP-PI, which is a fast method for computing approximate Shapley values. Several variants of SHAP-PI were evaluated:

1. SHAP-PI Vanilla: The original SHAP-PI algorithm (modified for global explanations instead of local ones), which approximates the conditional distribution of the data with the marginal distribution of the data.

2. SHAP-PI PN-Exact: A modified version of the SHAP-PI algorithm that uses the exact projected nearest neighbors, described in connection with Algorithm 1 above, to sample from the approximate empirical conditional distribution.

3. SHAP-PI PN-random: A modified version of the SHAP-PI algorithm that uses the fast approximate conditional sampling technique, described in connection with Algorithm 2 above, to sample from the approximate empirical conditional distribution.

4. SHAP-PI PN-KD-Tree: A modified version of the SHAP-PI algorithm that uses the stratified fast approximate conditional sampling technique, described in connection with Algorithm 3 above, to sample from the approximate empirical conditional distribution.

An alternative approach to speed up approximate conditional distribution sampling is to use a 1+epsilon approximate nearest neighbors algorithm. Therefore, in addition to evaluating the effect of the above four variants, the effect of using the following two parameterizations of this SHAP-PI was also evaluated:

1. SHAP-PI PN-eps-1: A modified version of the SHAP-PI algorithm that uses 1+epsilon nearest neighbor queries to approximately sample from the empirical conditional distribution. These neighbors are guaranteed to be no more than 2 times worse than the true nearest neighbors. This method finds approximate nearest neighbors using the full dataset rather than a randomly sampled dataset as in the random sampling techniques described herein.

2. SHAP-PI PN-eps-7: This version of the SHAP-PI algorithm is the same as the version above, except that the nearest neighbors are guaranteed to be no more than 8 times worse than the true neighbors.

To obtain a measure for the "ground truth", explanations produced using an exact Shapley value method with an exact projected neighbors method to sample from the approximate empirical conditional distribution (referred to as SHAP PN-exact) was compared with explanations produced using each of the above 6 variants of SHAP-PI.

Based on the total running time required to perform the projected neighbor calculations used to sample from the approximate empirical conditional distribution, both of the SHAP-PI variants implementing conditional sampling techniques described herein (i.e., SHAP-PI PN-random and SHAP-PI PN KD-Tree) are at least 3 times faster than SHAP-PI PN-exact for all dataset sizes. In comparison, SHAP-PI PN-1-eps and -7-eps require only slightly less running time than SHAP-PI PN-exact. The Vanilla variant was shown to be slightly faster than SHAP-PI PN-random and SHAP-PI PN KD-Tree.

Next, to measure how faithful the approximations were to the exact explanations, the relative mean absolute errors of each feature attribution score were examined. For small datasets (2000 data instances), SHAP-PI PN-exact and SHAP-PI PN-KD-Tree are statistically tied for their errors. However, as the number of data instances increases SHAP-PI PN-random and SHAP-PI PN KD-Tree start producing slightly worse approximations. For 50,000 data instances, the overall error rate of SHAP-PI PN-random and SHAP-PI PN KD-Tree is 5.6% compared to the 3.3% error rate of the SHAP-PI PN-exact and both of the SHAP-PI PN-eps techniques. This modest increase in error rates is quite reasonable given the more than 3-fold speedup of SHAP-PI PN-random and SHAP-PI PN KD-Tree in the time required to sample from the approximate conditional distribution for datasets of this size.

Finally, the confidence intervals of the feature attribution estimates of each SHAP-PI variant are compared. SHAP-PI PN-random and SHAP-PI PN KD-Tree increase the size of the confidence intervals compared to SHAP-PI Exact by a factor of approximately 1.4. However, SHAP-PI PN KD-Tree reduces the size of the confidence intervals from SHAP-PI PN-random, and hence the variance in the feature attributions, by a small but statistically significant amount. Since the cost of KD-Tree-based stratified sampling is quite small relative to random sampling, stratified sampling using a KD-Tree is generally preferable to random sampling. It is expected that the difference in quality between SHAP-PI PN-random and SHAP-PI PN KD-Tree will increase for real datasets, which may contain more complex structure in the data than the simple synthetic benchmarks used to perform these experiments.

Machine Learning Explainers

It is important for a user to be able to understand why a given ML model made a given prediction or what factors affect the predictions of an ML model. Less-complex ML models, such as a simple linear regression model or a classification decision tree, are often referred to as being inherently interpretable. However, more complex ML models require additional techniques to produce explanations. Machine learning explainability (MLX) is the process of explaining and interpreting machine learning and deep learning models. MLX can be broadly categorized into local and global explainability. Local MLX explains why an ML model made a specific prediction corresponding to a given data instance. In other words, local MLX answers the question: "Why did a particular ML model make a specific prediction?" Global MLX explains the general behavior of an ML model as a whole. In other words, global MLX answers the question: "How does a particular ML model work?" or "What did a particular ML model learn from the training data?"

For both local and global explainability, MLX techniques can further be classified as model-agnostic or model-specific. For model-agnostic MLX, the explanations are separated from the underlying ML model being explained, treating the model as a black box. For model-specific MLX, the explanations are tied to the architecture and/or properties of the underlying ML model. There are many different explanation techniques for each combination of local/global and model-agnostic/model-specific explanations, which include model-agnostic MLX (either global or local) that make use of perturbation-based feature importance techniques as described below.

Model Agnostic, Permutation-Based Explanation Techniques

The key goal of global model-agnostic MLX is to extract the global feature importance from a trained ML or deep learning model (referred to herein as a "black-box model"). To explain the global behavior of a model, permutation-based explanation techniques evaluate how the predictions of a black-box model change on permuted (or perturbed) versions of a given dataset. A feature that, when permuted, has a relatively large effect on the model's predictions is considered to be more important than a permuted feature that results in little-to-no change in the model's predictions.

Figure 6:
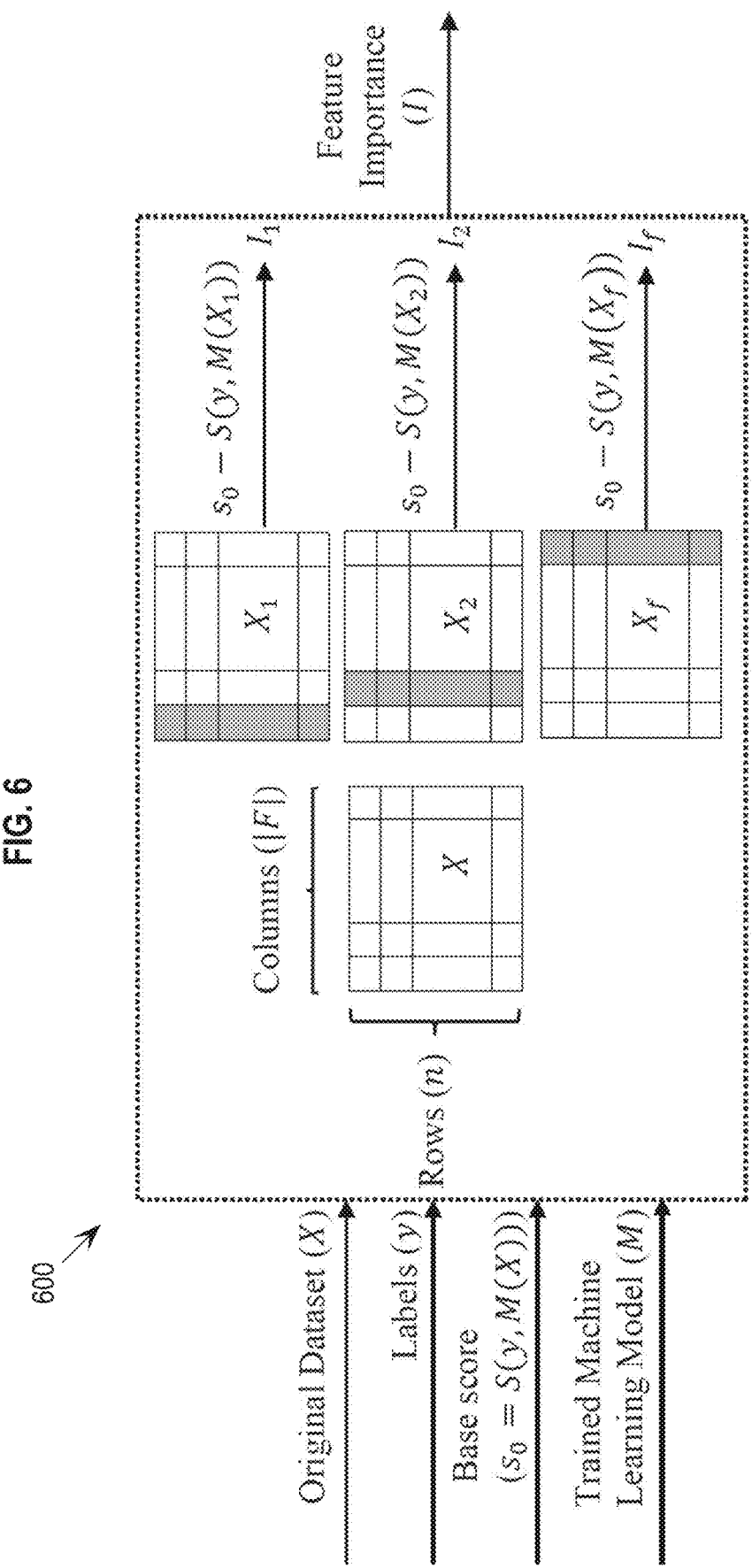
FIG. 6 depicts an overview of a feature importance-based ML explainer.

PI is an example of a permutation-based explanation technique. (Additional information regarding PI is found in "Random forests" by Leo Breiman, *Machine learning* 45.1 (2001): 5-32, the entire contents of which are hereby incorporated by reference as if fully set forth herein.) Specifically, PI measures the decrease in model prediction score compared to a base score (on an original dataset) when features are permuted (perturbed) one at a time. FIG. 6 depicts an overview of a PI ML explainer, in which X is an original dataset with n rows and |F| feature columns. $X_i$ represents duplicate versions of X in which column i is randomly perturbed. M(X) denotes the prediction of a black-box ML model, M, for X. Further, S(true labels, prediction) denotes the score (quality) of the predictions. The PI technique can be summarized in the following steps:

1. Using the trained black-box model M, compute a base score on the original dataset X (e.g., an F1 score for a classification type model, $R^2$ score for a regression type model, etc.)

2. For each feature (column) in a tabular dataset of
    Feature values (rows) for a particular feature are randomly perturbed. For example, a value for the feature for each data instance is sampled from the marginal distribution of the feature.
    Using the trained black-box model M, compute the new score on the permuted dataset (where only one feature has been permuted).
    Compute the difference between the model's score on the perturbed dataset and the base score computed for the original dataset. The decrease in the model's score is the permutation importance value for this feature.

3. Step 2 is repeated for N iterations. The average of the decrease in the model prediction score, for each feature, over the N iterations represents the final permutation feature importance values for the features. Averaging the feature importance values, for the different features, over multiple iterations provides a more stable and reproducible explanation than performing only a single iteration.

As indicated above, many existing perturbation-based MLX methods rely on randomly sampling (or permuting) the values of a feature column in a dataset and measuring the resulting decrease in accuracy of a trained model's predictions. The less accurate the model's predictions are when the feature values are randomly modified, the more important that feature was to the model when making its predictions.

Shapley-Based Explanation Techniques

Another MLX approach based on Shapley values, typically applied as a local explainability method, is inspired by coalitional game theory. Coalitional game theory formally defines a game with N players and computes the total payoff that the coalition members (players) can achieve for some target. Shapley values uniquely specify how to split the total payoff (output) fairly among the players (inputs), while satisfying the rules of the game. (Additional information regarding Shapley values is found in "A value for n-person games" by Lloyd S. Shapley, *Contributions to the Theory of Games* 2.28 (1953): 307-317, the entire contents of which are hereby incorporated by reference as if fully set forth herein.) This problem is different from simply dividing the reward based on each player's value (weight) because interactions between players and whether or not all players are present (in the coalition) can determine how important each player was to the game, and hence each player's contribution toward the reward. Shapley values obtain each player's actual contribution by averaging the payoffs with and without this player for all of the possible coalitions that can be formed. Thus, the number of possible coalition combinations grows exponentially with the number of players in a game, which can limit the feasibility of MLX approaches that use such a technique.

Relating game theory and Shapley values to MLX, there are different features (players) contributing to the output or score of the black-box ML model (payoff), and the goal is to compute the feature attributions (player rewards) while also considering feature interactions. There are multiple different techniques for computing or approximating Shapley values, such as a sampling-based approach; a permutation-based approach; Kernel SHAP, which fits a linear model to randomly sampled coalitions; and Tree SHAP, which exploits the structure of tree-based machine learning models to quickly compute a modified version of Shapley values.

Existing Solutions for Preserving the Data Distribution

There has recently been significant attention devoted to feature attribution methods that sample from the conditional distribution or otherwise preserve the realism of the data distribution used to create the explanations. For example, conditional Permutation Importance and Tree SHAP both exploit properties of tree-based models to obtain estimates for the conditional expectation of the value of a coalition. However, both methods can therefore only be applied to explaining tree-based models such as random forests, isolation forests, or decision trees. Furthermore, it has been shown that the latter does a poor job approximating the conditional expectation since the trees (which were built to maximize predictive accuracy) may not ensure the desired feature independence within each leaf (a problem that likely also affects the former).

It has been proposed to use a model-agnostic, "cohort"-based approach for calculating Shapley values that operates exclusively on the training data and model predictions. Instead of replacing the values of features that are absent from the coalition, this technique simply finds all data instances that contain feature values that are similar to those of the target data instance to be explained, for the features in the coalition. Then, the mean prediction value for these data instances is compared against a reference cohort, for example, the cohort that contains the data instance such that every feature is similar to those in the target data instance. However, given that these techniques do not evaluate the black-box model on any data instances other than the training data, these techniques can potentially be quite unstable—especially for anomaly detection—when there are very few data instances within some of the cohorts. For example, if it is required that all of the features of data instances in a given cohort be similar to those of an anomaly, it is likely that the cohort will contain only that specific anomaly.

Hardware Overview

Dataset 322 may reside in volatile and/or non-volatile storage, including persistent storage 320 or flash memory, or volatile memory of computing device 300. Additionally, or alternatively, dataset 322 may be stored, at least in part, in main memory of a database server computing device.

An application, such as sampling application 310, runs on a computing device and comprises a combination of software and allocation of resources from the computing device. Specifically, an application is a combination of integrated software components and an allocation of computational resources, such as memory, and/or processes on the computing device for executing the integrated software components on a processor, the combination of the software and computational resources being dedicated to performing the stated functions of the application.

One or more of the functions attributed to any process described herein, may be performed any other logical entity that may or may not be depicted in FIG. 3, according to one or more embodiments. In an embodiment, each of the techniques and/or functionality described herein is performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
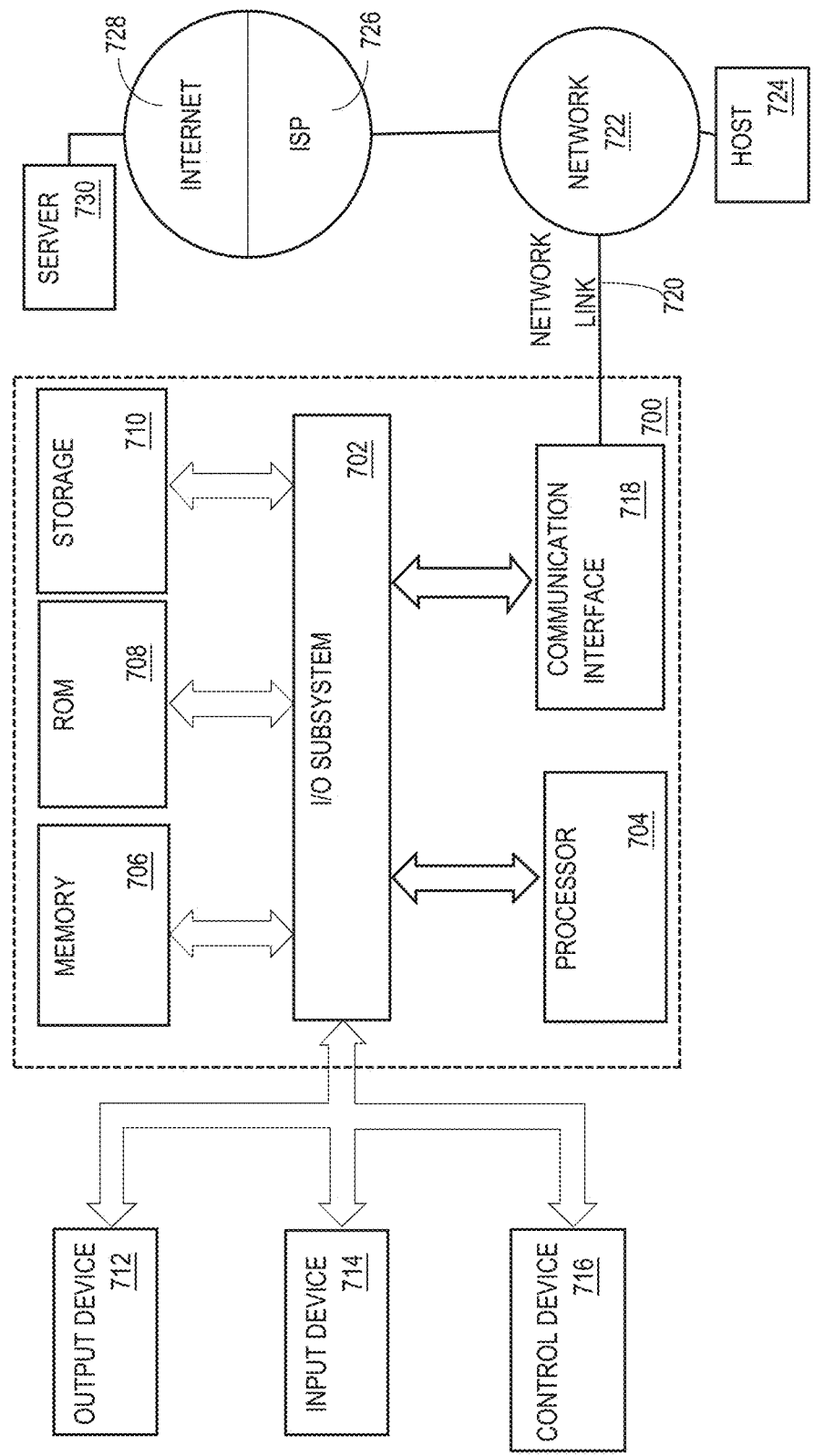
FIG. 7 is a block diagram that illustrates a computer system upon which an embodiment may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general-purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic, or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network now commonly referred to as the "Internet" 728. Local network 722 and Internet 728 both use electrical, electromagnetic, or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

Software Overview

Figure 8:
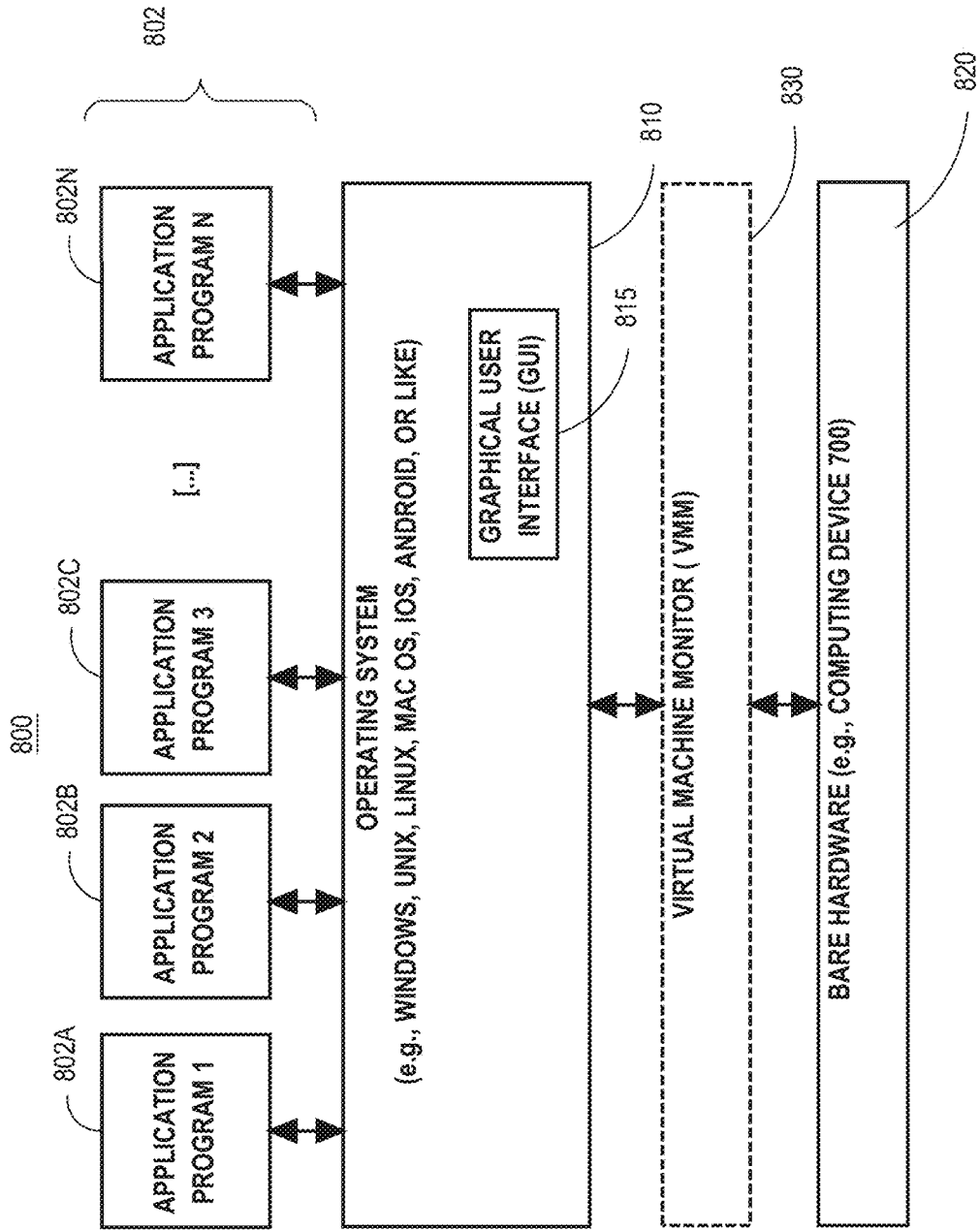
FIG. 8 is a block diagram of a basic software system that may be employed for controlling the operation of a computer system.

FIG. 8 is a block diagram of a basic software system 800 that may be employed for controlling the operation of computer system 700. Software system 800 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 800 is provided for directing the operation of computer system 700. Software system 800, which may be stored in system memory (RAM) 706 and on fixed storage (e.g., hard disk or flash memory) 710, includes a kernel or operating system (OS) 810.

The OS 810 manages low-level aspects of computer operation, including managing execution of processes, memory allocation, file input and output (I/O), and device I/O. One or more application programs, represented as 802A, 802B, 802C . . . 802N, may be "loaded" (e.g., transferred from fixed storage 710 into memory 706) for execution by the system 800. The applications or other software intended for use on computer system 700 may also be stored as a set of downloadable computer-executable instructions, for example, for downloading and installation from an Internet location (e.g., a Web server, an app store, or other online service).

Software system 800 includes a graphical user interface (GUI) 815, for receiving user commands and data in a graphical (e.g., "point-and-click" or "touch gesture") fashion. These inputs, in turn, may be acted upon by the system 800 in accordance with instructions from operating system 810 and/or application(s) 802. The GUI 815 also serves to display the results of operation from the OS 810 and application(s) 802, whereupon the user may supply additional inputs or terminate the session (e.g., log off).

OS 810 can execute directly on the bare hardware 820 (e.g., processor(s) 704) of computer system 700. Alternatively, a hypervisor or virtual machine monitor (VMM) 830 may be interposed between the bare hardware 820 and the OS 810. In this configuration, VMM 830 acts as a software "cushion" or virtualization layer between the OS 810 and the bare hardware 820 of the computer system 700.

VMM 830 instantiates and runs one or more virtual machine instances ("guest machines"). Each guest machine comprises a "guest" operating system, such as OS 810, and one or more applications, such as application(s) 802, designed to execute on the guest operating system. The VMM 830 presents the guest operating systems with a virtual operating platform and manages the execution of the guest operating systems.

In some instances, the VMM 830 may allow a guest operating system to run as if it is running on the bare hardware 820 of computer system 700 directly. In these instances, the same version of the guest operating system configured to execute on the bare hardware 820 directly may also execute on VMM 830 without modification or reconfiguration. In other words, VMM 830 may provide full hardware and CPU virtualization to a guest operating system in some instances.

In other instances, a guest operating system may be specially designed or configured to execute on VMM 830 for efficiency. In these instances, the guest operating system is "aware" that it executes on a virtual machine monitor. In other words, VMM 830 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g., content of registers) between allotments of the hardware processor time when the computer system process is not running. Computer system processes run under the control of an operating system, and may run under the control of other programs being executed on the computer system.

The above-described basic computer hardware and software is presented for purposes of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-executed method for an importance-based machine learning (ML) explainer for an ML model, comprising:

randomly sampling a particular dataset to generate, in memory, a random sample dataset of the particular dataset, wherein:

each data instance in the particular data set has a set of features, the set of features comprises a subset of features that are to be kept and a subset of features that are to be replaced, and the subset of features that are to be replaced includes a particular feature to be tested;

after randomly sampling the particular dataset to identify the random sample dataset:

identifying a set of nearest neighbor data instances, from the random sample dataset, based on one or more similarities between the subset of features that are to be kept in a target data instance in the particular dataset and the nearest neighbor data instances of the subset of features that are to be kept in the set of nearest neighbor data instances;

wherein the set of nearest neighbor data instances has a particular number of data instances;

wherein each data instance, of the set of nearest neighbor data instances, is one of the particular number of data instances nearest to the target data instance among the data instances of the random sample dataset in a subspace of the subset of features that are to be kept;

generating a set of perturbed data instances, based on the target instance, by generating, for each nearest neighbor data instance of the set of nearest neighbor data instances, a corresponding perturbed data instance comprising: a feature value of said each nearest neighbor data instance for the subset of features that are to be replaced of the corresponding generated data instance, and feature values of the target data instance for the subset of features that are to be kept; and generating an importance score for at least the particular tested feature for the ML model based on a difference between output of the ML model using the target data instance and output of the ML model using the set of perturbed data instances, wherein the method is performed by one or more computing devices.

2. The computer-executed method of claim 1, wherein randomly sampling the particular dataset to identify the random sample dataset of the particular dataset comprises:

generating a KD-Tree that comprises the data instances of the particular dataset;

wherein the KD-Tree comprises a plurality of buckets;

wherein each bucket, of the plurality of buckets, includes a unique set of similar data instances from the particular dataset;

for each bucket of the plurality of buckets, including, in the random sample dataset, a randomly-selected subset of the unique set of similar data instances in said each bucket.

3. The computer-executed method of claim 2, wherein generating the importance score for at least the particular tested feature comprises:

obtaining a first prediction, for the target data instance, using the ML model;

obtaining a second prediction, for a particular perturbed data instance of the set of perturbed data instances, using the ML model;

determining a difference metric that measures a difference between the first prediction and the second prediction; and using the difference metric to determine the importance score for the particular tested feature with respect to the ML model.

4. The computer-executed method of claim 3, wherein the ML model is configured to identify anomalous data instances in a test data set.

5. The computer-executed method of claim 1, wherein the random sample dataset represents 1/kth of the particular dataset.

6. The computer-executed method of claim 5, wherein the particular number of nearest neighbor data instances in the set of nearest neighbor data instances is one.

7. The computer-executed method of claim 1, wherein generating the importance score for at least the particular tested feature comprises:

obtaining a first prediction, for the target data instance, using the ML model;

obtaining a second prediction, for a particular perturbed data instance of the set of generated perturbed data instances, using the ML model;

determining a difference metric that measures a difference between the first prediction and the second prediction; and using the difference metric to determine the importance score for the particular tested feature.

8. The computer-executed method of claim 1, wherein each nearest neighbor data instance, of the set of nearest neighbor data instances, comprises first one or more feature values for one or more features that are more similar, to second one or more feature values for the one or more features of the target data instance, than data instances in the random sample dataset that are excluded from the set of nearest neighbor data instances.

9. The computer-executed method of claim 1, wherein the ML model is configured to identify anomalous data instances in a test data set.

10. A computer-executed method for an importance-based machine learning (ML) explainer for an ML model, comprising:

generating a KD-Tree that comprises the data instances of a particular dataset to be sampled;

wherein the KD-Tree comprises a plurality of buckets;

wherein each bucket, of the plurality of buckets, includes a unique set of similar data instances from the particular dataset;

generating a random sample dataset from the particular dataset by, for each bucket of the plurality of buckets, including, in the random sample dataset, a randomly-selected subset of the unique set of similar data instances in said each bucket, wherein:

each data instance in the particular data set has a set of features, the set of features comprises a subset of features that are to be kept and a subset of features that are to be replaced, and the subset of features that are to be replaced includes a particular feature to be tested;

identifying a set of nearest neighbor data instances, from the random sample dataset, based on one or more similarities between a target data instance in the particular dataset and the nearest neighbor data instances, wherein each data instance, of the set of nearest neighbor data instances, is one of the particular number of data instances nearest to the target data instance among the data instances of the random sample dataset in a subspace of the subset of features that are to be kept;

generating a set of perturbed data instances, based on the target instance, by generating, for each nearest neighbor data instance of the set of nearest neighbor data instances, a corresponding perturbed data instance comprising: a feature value of said each nearest neighbor data instance for the subset of features that are to be replaced of the corresponding generated data instance, and feature values of the target data instance for the subset of features that are to be kept; and generating an importance score for at least the particular tested feature for the ML model based on a difference between output of the ML model using the target data instance and output of the ML model using the set of perturbed data instances, wherein the method is performed by one or more computing devices.

11. One or more non-transitory computer-readable media storing one or more sequences of instructions that, when executed by one or more processors, cause:

randomly sampling a particular dataset to generate, in memory, a random sample dataset of the particular dataset, wherein:
  each data instance in the particular data set has a set of features,
  the set of features comprises a subset of features that are to be kept and a subset of features that are to be replaced, and
  the subset of features that are to be replaced includes a particular feature to be tested;
after randomly sampling the particular dataset to identify the random sample dataset:
  identifying a set of nearest neighbor data instances, from the random sample dataset, based on one or more similarities between the subset of features that are to be kept in a target data instance in the particular dataset and the subset of features that are to be kept in the nearest neighbor data instances of the set of nearest neighbor data instances;
  wherein the set of nearest neighbor data instances has a particular number of data instances;
  wherein each data instance, of the set of nearest neighbor data instances, is one of the particular number of data instances nearest to the target data instance among the data instances of the random sample dataset in a subspace of the subset of features that are to be kept;
generating a set of perturbed data instances, based on the target instance, by generating, for each nearest neighbor data instance of the set of nearest neighbor data instances, a corresponding perturbed data instance comprising: a feature value of said each nearest neighbor data instance for the subset of features that are to be replaced of the corresponding generated data instance, and feature values of the target data instance for the subset of features that are to be kept; and
generating an importance score for at least the particular tested feature for an ML model based on a difference between output of the ML model using the target data instance and output of the ML model using the set of perturbed data instances.

12. The one or more non-transitory computer-readable media of claim 11, wherein randomly sampling the particular dataset to identify the random sample dataset of the particular dataset comprises:
  generating a KD-Tree that comprises the data instances of the particular dataset;
  wherein the KD-Tree comprises a plurality of buckets;
  wherein each bucket, of the plurality of buckets, includes a unique set of similar data instances from the particular dataset;
  for each bucket of the plurality of buckets, including, in the random sample dataset, a randomly-selected subset of the unique set of similar data instances in said each bucket.

13. The one or more non-transitory computer-readable media of claim 12, wherein generating the importance score for at least the particular tested feature comprises:
  obtaining a first prediction, for the target data instance, using the ML model;
  obtaining a second prediction, for a particular perturbed data instance of the set of perturbed data instances, using the ML model;
  determining a difference metric that measures a difference between the first prediction and the second prediction; and
  using the difference metric to determine the importance score for the particular tested feature with respect to the ML model.

14. The one or more non-transitory computer-readable media of claim 13, wherein the ML model is configured to identify anomalous data instances in a test data set.

15. The one or more non-transitory computer-readable media of claim 11, wherein the random sample dataset represents 1/kth of the particular dataset.

16. The one or more non-transitory computer-readable media of claim 15, wherein the particular number of nearest neighbor data instances in the set of nearest neighbor data instances is one.

17. The one or more non-transitory computer-readable media of claim 11, wherein generating the importance score for at least the particular tested feature comprises:
  obtaining a first prediction, for the target data instance, using the ML model;
  obtaining a second prediction, for a particular perturbed data instance of the set of perturbed data instances, using the ML model;
  determining a difference metric that measures a difference between the first prediction and the second prediction; and
  using the difference metric to determine the importance score for the particular tested feature.

18. The one or more non-transitory computer-readable media of claim 11, wherein each nearest neighbor data instance, of the set of nearest neighbor data instances, comprises first one or more feature values for one or more features that are more similar, to second one or more feature values for the one or more features of the target data instance, than data instances in the random sample dataset that are excluded from the set of nearest neighbor data instances.

19. The one or more non-transitory computer-readable media of claim 11, wherein the ML model is configured to identify anomalous data instances in a test data set.

20. One or more non-transitory computer-readable media storing one or more sequences of instructions that, when executed by one or more processors, cause:
  generating a KD-Tree that comprises the data instances of a particular dataset to be sampled;
  wherein the KD-Tree comprises a plurality of buckets;
  wherein each bucket, of the plurality of buckets, includes a unique set of similar data instances from the particular dataset;
  generating a random sample dataset from the particular dataset by, for each bucket of the plurality of buckets, including, in the random sample dataset, a randomly-selected subset of the unique set of similar data instances in said each bucket, wherein:
    each data instance in the particular data set has a set of features,
    the set of features comprises a subset of features that are to be kept and a subset of features that are to be replaced, and
    the subset of features that are to be replaced includes a particular feature to be tested;
  identifying a set of nearest neighbor data instances, from the random sample dataset, based on one or more similarities between a target data instance in the particular dataset and the nearest neighbor data instances, wherein each data instance, of the set of nearest neighbor data instances, is one of the particular number of data instances nearest to the target data instance among the data instances of the random sample dataset in a subspace of the subset of features that are to be kept;

generating a set of perturbed data instances, based on the target instance, by generating, for each nearest neighbor data instance of the set of nearest neighbor data instances, a corresponding perturbed data instance comprising: a feature value of said each nearest neighbor data instance for the subset of features that are to be replaced of the corresponding generated data instance, and feature values of the target data instance for the subset of features that are to be kept; and generating an importance score for at least the particular tested feature for an ML model based on a difference between output of the ML model using the target data instance and output of the ML model using the set of perturbed data instances.

* * * * *

UNITED STATES PATENT AND TRADEMARK OFFICE
CERTIFICATE OF CORRECTION

PATENT NO. : 11,687,540 B2
APPLICATION NO. : 17/179265
DATED : June 27, 2023
INVENTOR(S) : Pushak et al.

It is certified that error appears in the above-identified patent and that said Letters Patent is hereby corrected as shown below:

On the Title Page

On page 2, Column 2, under Other Publications, Line 17, delete "dwnloaded" and insert -- downloaded --, therefor.

On page 2, Column 2, under Other Publications, Line 20, delete "dwnloaded" and insert -- downloaded --, therefor.

On page 2, Column 2, under Other Publications, Line 23, delete "dwnloaded" and insert -- downloaded --, therefor.

On page 2, Column 2, under Other Publications, Line 26, delete "Communctns," and insert -- Communications, --, therefor.

In the Specification

In Column 12, Line 57, delete "O(n-log(n))," and insert -- $O(n \cdot \log(n))$, --, therefor.

In Column 13, Line 47, delete "rows or X" and insert -- rows of X --, therefor.

In Column 14, Line 57, delete "yperturbed perturbed" and insert -- yperturbed --, therefor.

In Column 18, Line 17, delete "dataset of" and insert -- dataset of X: --, therefor.

In the Claims

In Column 26, Line 2, in Claim 7, delete "generated perturbed" and insert -- perturbed --, therefor.

Signed and Sealed this
Twenty-eighth Day of May, 2024

Katherine Kelly Vidal
*Director of the United States Patent and Trademark Office*